United States Patent
Skultety-Betz et al.

(10) Patent No.: US 8,102,515 B2
(45) Date of Patent: Jan. 24, 2012

(54) MEASURING DEVICE

(75) Inventors: Uwe Skultety-Betz, Leinfelden-Echterdingen (DE); Bjoern Haase, Stuttgart (DE); Joerg Stierle, Waldenbuch (DE); Peter Wolf, Leinfelden-Echterdingen (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 11/912,682

(22) PCT Filed: Jul. 3, 2006

(86) PCT No.: PCT/EP2006/063781
§ 371 (c)(1),
(2), (4) Date: Oct. 26, 2007

(87) PCT Pub. No.: WO2007/017311
PCT Pub. Date: Feb. 15, 2007

(65) Prior Publication Data
US 2009/0273769 A1 Nov. 5, 2009

(30) Foreign Application Priority Data
Aug. 8, 2005 (DE) .......................... 10 2005 037 251

(51) Int. Cl.
*G01C 3/08* (2006.01)
(52) U.S. Cl. ....... 356/4.01; 356/3.01; 356/4.1; 356/5.01
(58) Field of Classification Search ........ 356/3.01–3.15, 356/4.01–4.1, 5.01–5.15, 6–22
See application file for complete search history.

(56) References Cited

U.S. PATENT DOCUMENTS

| 5,235,454 | A |   | 8/1993 | Iwasaki |
| 5,815,251 | A | * | 9/1998 | Ehbets et al. ............... 356/5.01 |
| 5,880,822 | A |   | 3/1999 | Kubo |
| 5,926,259 | A | * | 7/1999 | Bamberger et al. .......... 356/5.01 |
| 6,717,170 | B2 |  | 4/2004 | Woerner |
| 6,781,675 | B2 |  | 8/2004 | Gogolla et al. |
| 2001/0048517 | A1 |  | 12/2001 | Shirai |
| 2001/0050763 | A1 | * | 12/2001 | Shirai ............................. 356/5.1 |
| 2005/0213245 | A1 | * | 9/2005 | Katsura et al. ................ 360/125 |

FOREIGN PATENT DOCUMENTS

| DE | 43 16 348 | 11/1994 |
| DE | 198 04 050 | 8/1999 |
| DE | 198 04 059 | 8/1999 |
| EP | 0 793 117 | 9/1997 |
| EP | 1 054 267 | 11/2000 |
| EP | 1 176 430 | 1/2002 |
| EP | 1 351 070 | 10/2003 |
| GB | 2 333 920 | 8/1999 |
| GB | 2 334 172 | 8/1999 |
| JP | 2004-294465 | 10/2004 |
| WO | 93/20458 | 10/1993 |

* cited by examiner

*Primary Examiner* — Thomas Tarcza
*Assistant Examiner* — Luke Ratcliffe
(74) *Attorney, Agent, or Firm* — Michael J. Striker

(57) ABSTRACT

The invention relates to a measuring instrument, particularly a hand-held instrument (10) for measuring distances, comprising at least one transmission branch (28) for a test signal and adjustable switching means (36) for deflecting the test signal. The switching means (36) reflect at least a portion of the test signal in a first switched position (42) while unblocking the transmission branch (28) for the measuring radiation in a second switched position (42'). According to the invention, the switching means (36) reflect the measuring radiation in a diffuse manner in the first switched position (42). Also disclosed is a method for producing such a measuring instrument.

14 Claims, 3 Drawing Sheets

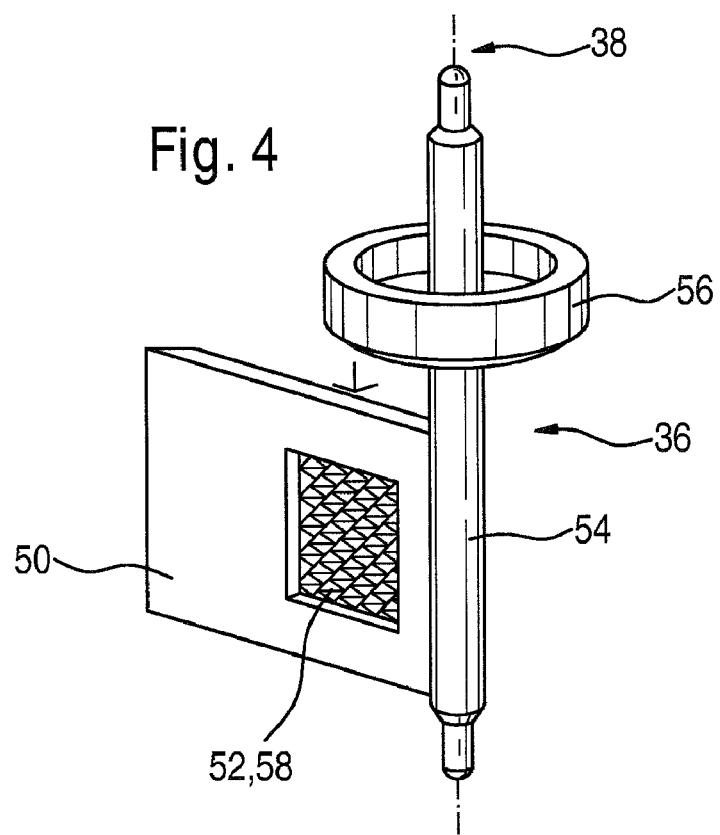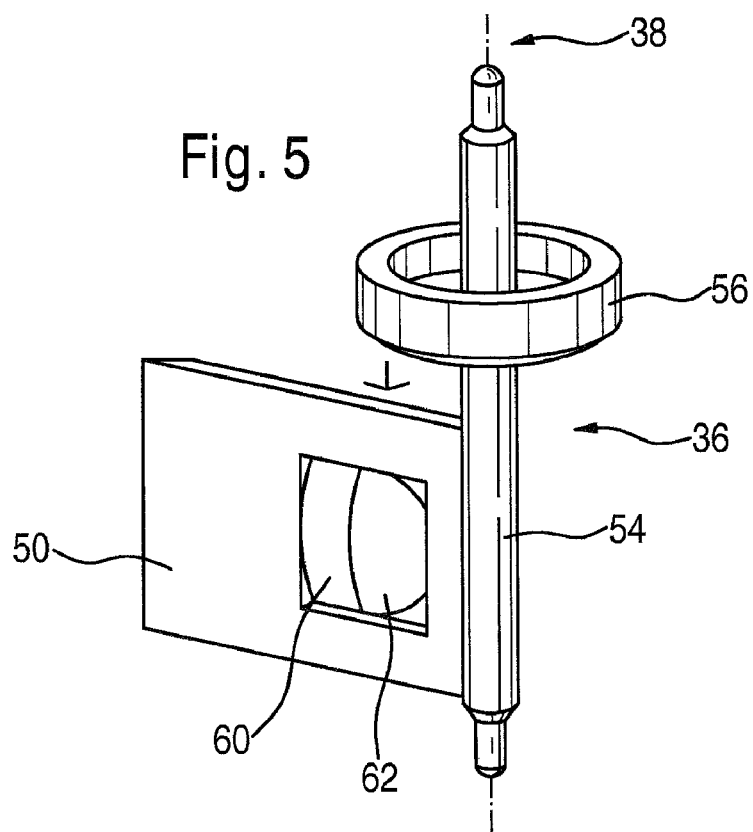

MEASURING DEVICE

CROSS-REFERENCE TO RELATED APPLICATION

The invention described and claimed hereinbelow is also described in German Patent Application DE 10 2006 037 251.1 filed on Aug. 8, 2005. This German Patent Application, whose subject matter is incorporated here by reference, provides the basis for a claim of priority of invention under 35 U.S.C. 119(a)-(d).

BACKGROUND OF THE INVENTION

The present invention relates to a measuring device, in particular a hand-held device for measuring distances.

In order to attain the most accurate measurement result possible when performing a measurement, e.g., a distance measurement, it is advantageous when a known reference variable, e.g., a known reference distance in the case of a distance measurement, is available. With the aid of a reference variable of this type, the measurement device may be, e.g., calibrated occasionally, or transit times of the measurement signal inside the device may be determined so that they may be taken into account in a measurement.

Publication DE 198 040 50 A1 makes known a distance measurement with a laser diode and a photodiode for generating and/or receiving a send or receive signal. In order to calibrate this distance-measuring device, it is provided with an adjustable flap, which, when a reference measurement is carried out, is swiveled by a servo drive into an optical path of the transmitted measurement signal, thereby deflecting the transmitted measurement signal and directing it via a reference path directly to the photodiode.

Publication EP 1351070 A1 makes known an electro-optical, para-axial distance-measuring system, with which a rigid, stationary edge extends into the transmission path of the measuring device, in order to direct a portion of the measurement beam directly onto the receiving diode or an additional reference diode.

Publication DE 43 163 48 A1 makes known a device for measuring distance, which includes a switchable beam-deflection device, which may be swiveled about an axis using a motor. The surface of the beam-deflection device struck by the measurement beam reflects a directed, divergent light cone in the direction of an optical fiber, which is used as an optical waveguide. The opening of the light cone is so great that radiation may penetrate the incident face of the optical waveguide in all positions of the laterally displaceable optical waveguide.

SUMMARY OF THE INVENTION

The present invention is directed to a measuring device, in particular a hand-held measuring device for measuring distance, with at least one sending branch for a measurement signal, and with adjustable switching means for deflecting the measurement signal. In a first position, the switching means reflect at least a portion of the measurement signal and, in a second switching position, they release the sending branch for the measurement beam.

It is provided that, in the first position, the switching means reflect the measurement beam diffusely, i.e., in an undirected manner in particular.

Measuring devices, and rangefinders in particular, as they are designed today make it possible to measure distance across a large range. Rangefinders with a possible measurement width much greater than 100 m, with a resolution in the mm range, are now commercially available to anyone. In order to measure such a great distance while maintaining a high resolution of the distance measurement, a sensitive receiver and/or a measurement signal with a relatively high signal intensity are/is required.

When, as part of a reference measurement, the measurement signal is directed directly to a reference diode or the receiving diode, the high signal intensity may result in overdrive and, therefore, in a measuring error in the reference measurement. The purpose of a reference measurement—with which a reference path internal to the device is measured—is to increase the accuracy of the measuring device and, therefore, the reliability of the measurement, however.

With devices in the related art, the radiation intensity in a reference measurement is therefore reduced, e.g., via a large distance to the receiver or by using additional filter elements.

Given that rangefinders are becoming smaller and more compact, a direct path between the reference switchover element and the receiving or reference diode is desired, in particular. This direct path of the measurement signal to the reference diode results in a high measurement signal intensity on the receiving detector, however.

Advantageously, with the measuring device provided, the measurement beam in a reference measurement is not sent completely and in a targeted manner to the receiving diode used in the reference measurement. Instead, only a fraction of the measurement signal is used. Switching means are provided in the device for this purpose, which, in a first switch position, reflect and/or scatter the measurement signal diffusely, thereby allowing only a portion of the light intensity to strike a reference receiver.

Due to the diffuse reflection or scattering on the switching means, the measurement signal intensity used in the reference measurement is greatly reduced. The inventive embodiment of the switching means, which serve as the reference flap, may be manufactured using simple production means and in a cost-neutral manner. No additional components are required to reduce the signal.

The switching means advantageously include a reflecting surface, on which the measurement signal is reflected when a reference measurement is performed. The reflecting surface has an uneven surface structure. The surface structure of this reflecting surface of the switching means may be formed directly in the process of manufacturing the switching means. It is possible, e.g., to provide a defined eroding structure in an injection-moulding tool used to form the switching means. The switching means and the reflection structure may be advantageously formed directly in plastic.

In an advantageous embodiment of the inventive measuring device, the reflecting surface of the switching means are provided with a prism structure in the region of impact of the measurement beam, which results in a diffuse reflection, and, in particular, to a directionally-dependent, diffuse reflection of the measurement signal.

In an alternative embodiment of an inventive measuring device, the reflecting surface of the switching means may have a plurality of curved sub-surfaces, which result in a diffuse reflection and/or scattering of the incident measurement signal. Circular, curved cylindrical surfaces, for example, similar to a Frenel lens may be installed on or formed in the reflecting surface of the switching means. It is also possible to provide a large number of spherically curved surfaces or a combination of several surface structures of different types. In a further embodiment of the switching means, a plurality of cylindrically curved surfaces for diffuse reflection is provided.

One thing that all of these embodiments of the reflecting surface of the switching means have in common is the fact that the diffuse reflection is retained despite the dependence on direction, so that, after the measurement signal is reflected on the actuator, only a fraction of it strikes a receiving detector, which serves to provide a reference measurement.

Advantageously, the reflecting and/or scattering structure is designed as a single piece with the reflecting surface of the switching means. In particular, the reflecting surface may be formed directly during the injection-moulding process for the switching means, thereby resulting in a simple manufacturing method for the advantageous switching means and, therefore, for the inventive measuring device.

Further advantages of the inventive measuring device are disclosed in the drawing below and in the related description.

An exemplary embodiment of an inventive measuring device and several exemplary embodiments of an inventive switching means are depicted in the drawing, and they are described in greater detail in the subsequent description. The figures in the drawing, their description, and the claims contain combinations of numerous features. One skilled in the art will also consider the features individually and combine them to form further reasonable combinations.

BRIEF DESCRIPTION OF THE DRAWINGS

FIG. 4 shows a perspective view of a first exemplary embodiment of an inventive switching means, FIG. 5 shows an alternative exemplary embodiment of an inventive switching means, in a perspective view.

DESCRIPTION OF THE PREFERRED EMBODIMENTS

Figure 1:
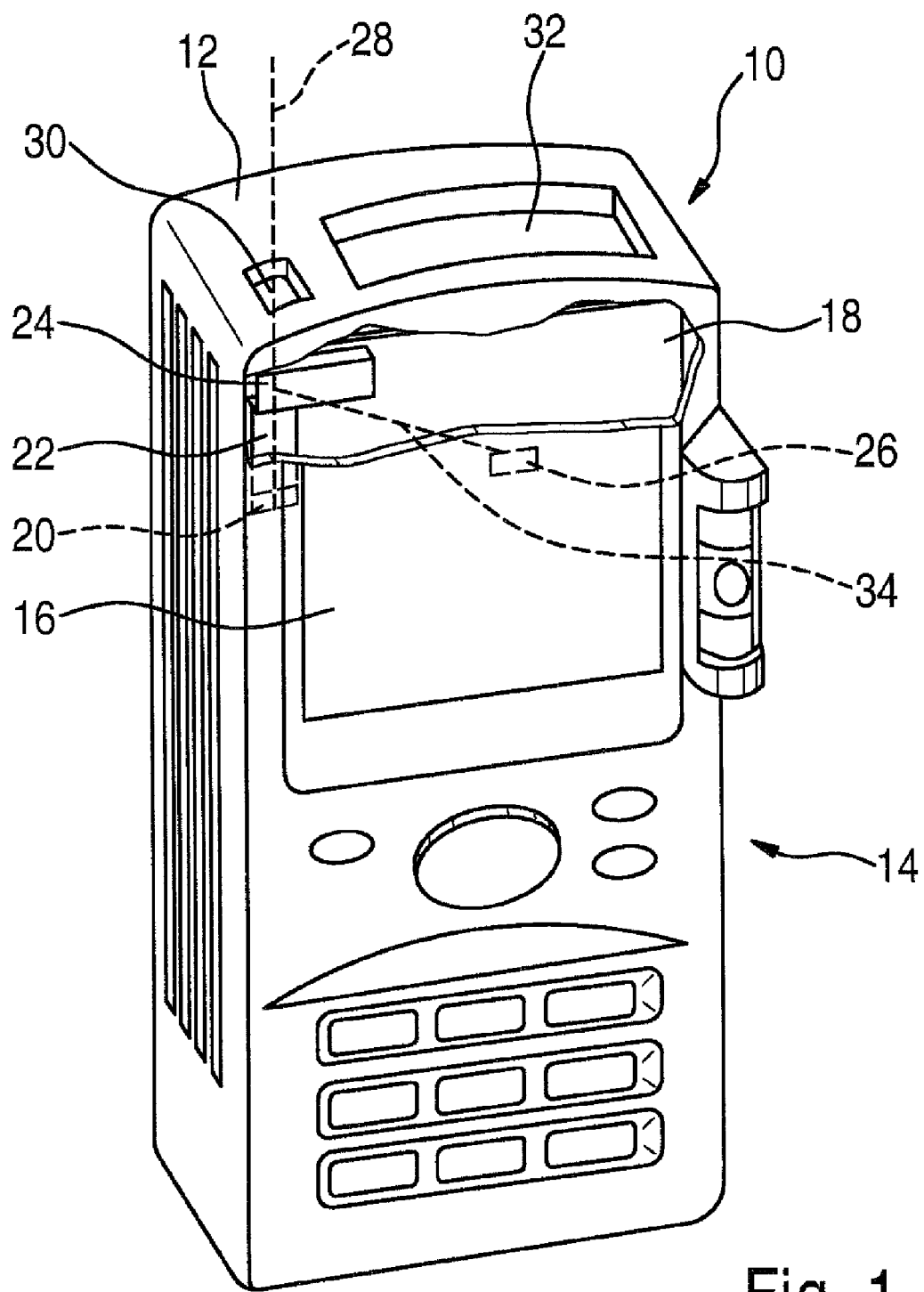
FIG. 1 shows a distance-measuring device with a transmitting unit, a receiver unit, and a deflecting unit, in a perspective overview depiction.

FIG. 1 shows a measuring device designed as a distance-measuring device 10. Distance-measuring device 10 includes a housing 12, and actuating elements 14 for switching distance-measuring device 10 on and off, and for starting and configuring a measuring procedure. In addition to actuating elements 14, the measuring device also includes a display 16 for depicting measurement results. The following are located on a carrier element 18 inside housing 12 of measuring device 10: A transmitting unit 20 designed as a laser diode for generating an optical transmitted measurement signal, a light channel 22, a deflecting unit 24 for deflecting the transmitted measurement signal, and a receiver unit 26 designed as a photodiode for receiving the received measurement signal. FIG. 1 shows schematic depictions of transmitting unit 20, light channel 22, deflecting unit 24, and a reference path 34 for receiver unit 26.

To measure a distance of distance-measuring device 10 to a remote object, transmitting unit 20 sends out a transmitted measurement signal along a sending branch 28 during operation. The transmitted measurement wavelength leaves the measuring device via a window 30 in housing 12 of the device. The measurement signal, which is reflected by a surface of a remote object, is received as a received measurement signal via receiving optics 32 by receiver unit 26, e.g., a photodiode. The transit time of the light may be deduced from this received measurement signal, e.g., using a phase comparison carried out between the transmitted measurement signal and the received measurement signal, thereby making it possible to determine the distance between the measuring device and the object to be measured based on the speed of light, which is a known quantity.

A reference measurement is carried out before a distance measurement is performed, in order to take transit times into account that are independent of the distance and that result, e.g., when the transmitted measurement signal is generated and/or when the received measurement signal is processed in the device. The transmitted measurement signal is deflected by deflection unit 24, and it is directed via a known reference path along a path 34 directly to receiver unit 26. In particular, no further optical components are located between deflecting unit 24 and reference diode 26, which serves as a receiver unit, thereby ensuring that the measurement signal coming directly from the deflecting unit strikes the reference diode.

Figure 2:
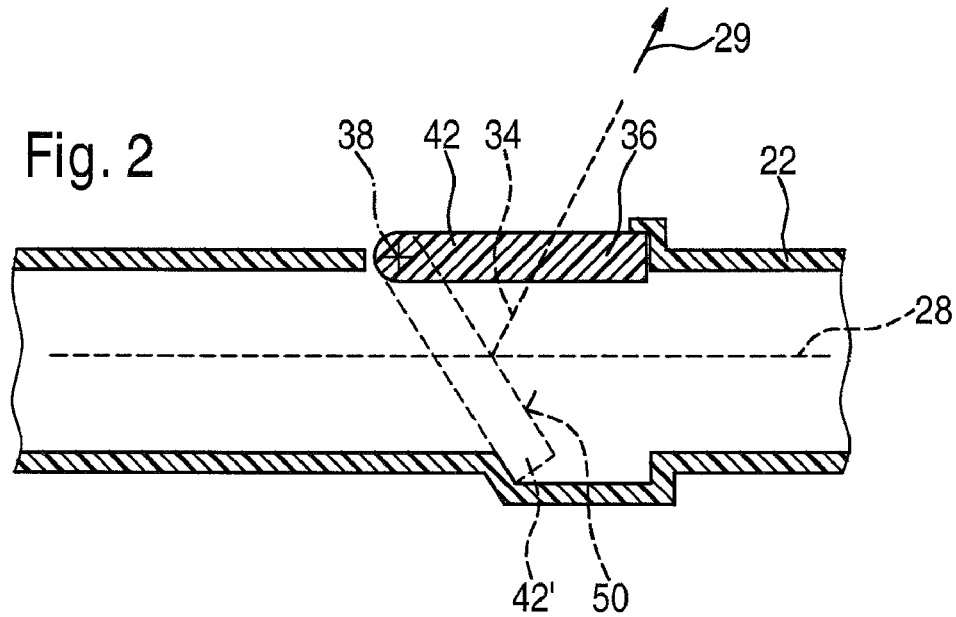
FIG. 2 shows a switching means of an inventive measuring device, in a sectional view.

FIG. 2 shows a deflecting unit 24 with switching means 36, which are designed essentially as a swivelable reference flap. It may be located, e.g., in light channel 22 of measuring device 10, and it may be supported such that it may swivel around a rotation axis 38. Switching means 36, which are designed as a flap-type element, are shown in FIG. 2 in their second switching position 42', so that sending branch 28 and/or channel 22 are/is released for the measurement wavelength. Flap-type element 36, in its first position 42, is also shown in FIG. 2, using dashed lines. In this first switched position 42 of switching element 36, the measurement signal, which is sent out along sending branch 28, is scattered on a reflecting surface 50 of switching means 36. Direction 29 of reference path 34 is also indicated in FIG. 2; it corresponds to the direction of a specular reflection of the measurement signal on reflecting surface 50. In contrast to specular reflection, a diffuse reflection or scattering takes place in the inventive measuring device, so a direction is not indicated therefor.

Figure 3:
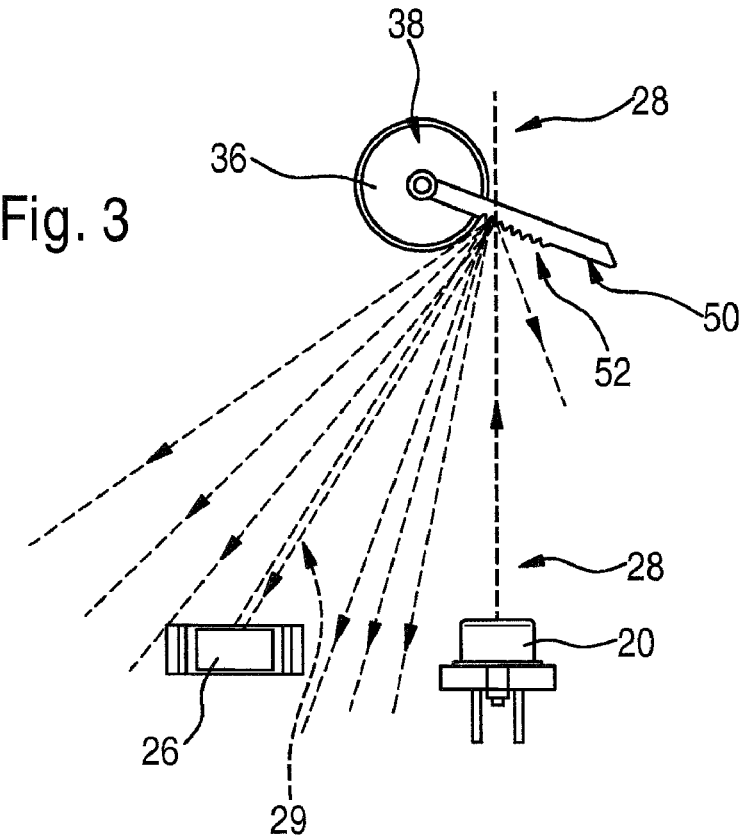
FIG. 3 shows a detailed view of the reference path of an inventive measuring device, in a schematic top view.

FIG. 3 shows a detailed top view of reference path 34 of an inventive measuring device. A transmitting unit 20, which is designed as a laser diode, sends out a measurement signal along measurement path 28, which is then reflected on switching means 36 of a deflecting unit 24. To this end, switching means 36 include a reflecting surface 50, which has—at least partially—an uneven, i.e., raw, in particular, surface structure 52. Due to uneven surface structure 52, the measurement signal is diffusely reflected and/or scattered on the switching means, so that the measurement signal is reflected not only in specular direction 29, but rather nearly in the entire half-space located opposite to reflecting surface 50. The reflection and/or scattering on the inventive switching means therefore takes place in a non-directed manner. This is indicated symbolically in FIG. 3 as a large number of measurement beam directions 31. Since the measurement signal that strikes switching means 36 is reflected diffusely and/or scattered, only a fraction of the measurement signal intensity reaches active surface 52 of receiver unit 26, as shown in FIG. 3.

FIG. 4 shows a first exemplary embodiment of switching means 36, which are designed as a flap-type element. Switching means 36 include a shaft 54, via which the switching means are supported in a manner that allows them to rotate around an axis 38. A permanent magnet 56 is installed on shaft 54. Permanent magnet 56 interacts with a controllable electromagnet, which is not shown in FIG. 4, thereby causing switching means 36 to rotate about central axis 38 of shaft 54 when the electromagnet is actuated accordingly.

A reflecting surface 50, which has—at least partially—an uneven, i.e., raw, in particular, surface structure 52—is formed as a single piece with shaft 54. To this end, reference surface 50 may have a prism structure 58 in the region of impact of the measurement radiation, which results in a diffuse reflection of the measurement beam that strikes this structure 58. Advantageously, shaft 54, reflecting surface 50, and prism structure 58 are designed as a single piece, e.g., made of plastic. In this manner, the uneven surface structure 52 of switching means 36 may be formed directly when the switching means are formed. The switching means may be manufactured, e.g., using an injection-moulding process in which uneven surface structure 52 is manufactured simultaneously with switching means 36 and, therefore, in a cost-neutral manner. For example, a defined eroding structure could be present at the corresponding point in the injection-moulding tool, which forms a corresponding structure—an uneven structure, in particular—on reflecting surface 50 of switching means 36.

In addition to prism structure 58 shown in FIG. 4, any type of uneven or raw surface structure 52 is possible. For example, uneven surface structure could also be produced using a plurality of curved surfaces 60 or 62, as depicted in a second exemplary embodiment of the inventive switching means shown in FIG. 5. Curves surfaces 60 and 62 could be designed as circular, curved cylindrical surfaces, similar to the structure of a Fresnel lens. A plurality of spherically curved surfaces or a plurality of cylindrically curved surfaces is also possible. Diffusely scattering surface structure 52 may also be produced using a combination of the structures shown here as examples or using a combination of further structures, of course.

Inventive switching element 36 and inventive measuring device 10 are not limited to the exemplary embodiments shown in the figures.

In particular, surface structure 52 of inventive switching element 36 is not limited to the embodiments shown in the figures. The type of diffusely scattering structure 52 and its boundary surface are not limited to the exemplary embodiments. Diffusely scattering structure 52 may also be formed with a round, rectangular, non-square, or oval boundary, for example.

What is claimed is:

1. A measuring device for measuring distance, comprising at least one sending branch (28) for a measurement signal, and adjustable switching means (36) redirecting the measurement signal, wherein in a first switch position (42), the switching means (36) reflect at least a portion of the measurement signal and, in a second switch position (42'), the switching means (36) release the sending branch (28) for the measurement beam, wherein, in the first switch position (42), the switching means (36) reflect the measurement beam diffusely so that the measurement beam is not sent completely and in a targeted manner to a receiver diode, but instead only a fraction of the measurement signal is used and only a portion of a light intensity strikes a reference unit and a measurement signal intensity used is thereby reduced.

2. The measuring device as recited in claim 1, wherein the switching means (36) include a reflecting surface (50), which at least partially includes an uneven surface structure (52).

3. The measuring device as recited in claim 1, wherein the reflecting surface (50) of the switching means (36) has a prism structure (58) in a region of impact of the measurement beam.

4. The measuring device as recited in claim 1, wherein the reflecting surface (50) of the switching means (36) includes a plurality of curved sub-surfaces (60, 62).

5. The measuring device as recited in claim 2, wherein the reflecting surface (50) is a single piece with a switching means (36).

6. The measuring device as recited in claim 1, wherein the switching means (36) are adjustable around a rotation axis (38).

7. The measuring device as recited in claim 6, wherein, the switching means are adjusted electromagnetically.

8. The measuring device as recited in claim 1, wherein the measurement beam is optical radiation.

9. The measuring device as recited in claim 1, wherein the measuring device is a laser rangefinder.

10. The measuring device as recited in claim 2, wherein the at least partially uneven surface structure (52) of the reflecting surface (50) of the switching means (36) is a single piece with the reflecting surface.

11. The measuring device as recited in Claim 1, wherein the measuring device is a hand-held device.

12. The measuring device as recited in Claim 8, wherein the measuring beam is modulated optical radiation.

13. A measuring device for measuring distance, comprising at least one sending branch (28) for a measurement signal, and adjustable switching means (36) for redirecting the measurement signal, wherein in a first switch position (42), the switching means (36) reflect at least a portion of the measurement signal and, in a second switch position (42'), the switching means (36) release the sending branch (28) for the measurement beam, wherein, in the first switch position (42), the switching means (36) reflect the measurement beam diffusely in an undirected manner so that the measurement beam is not sent completely and in a targeted manner to a receiver diode, but instead only a fraction of the measurement signal is used and only a portion of a light intensity strikes a reference unit and a measurement signal intensity used is thereby reduced.

14. A measuring device for measuring distance, comprising at least one sending branch (28) for a measurement signal, and adjustable switching means (36) for redirecting the measurement signal, wherein in a first switch position (42), the switching means (36) reflect at least a portion of the measurement signal and, in a second switch position (42'), the switching means (36) release the sending branch (28) for the measurement beam, wherein, in the first switch position (42), the switching means (36) reflect the measurement beam diffusely in an undirected manner, wherein the measurement beam is not sent completely and in a targeted manner to a receiver diode, but instead only a fraction of the measurement signal is used and only a portion of a light intensity strikes a reference unit and a measurement signal intensity used is thereby reduced, and wherein the switching means (36) includes a deflecting surface (50) which at least partially has an uneven surface structure (52).

* * * * *